US008792631B2

(12) United States Patent
Addair

(10) Patent No.: US 8,792,631 B2
(45) Date of Patent: Jul. 29, 2014

(54) SYSTEM AND METHOD FOR MATCHING SERVICE REPRESENTATIVES WITH CUSTOMERS

(75) Inventor: Jennifer Addair, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1238 days.

(21) Appl. No.: 12/419,604

(22) Filed: Apr. 7, 2009

(65) Prior Publication Data

US 2010/0254527 A1  Oct. 7, 2010

(51) Int. Cl.
*H04M 3/00* (2006.01)
*H04M 5/00* (2006.01)

(52) U.S. Cl.
USPC ............. 379/265.12; 379/265.01; 379/265.11

(58) Field of Classification Search
CPC ............ H04M 3/5233; H04M 3/5232; H04M 2203/2061; H04M 3/42068; H04M 3/42059; H04M 3/51; H04M 3/523
USPC ............. 379/265.01, 265.05, 265.11, 265.12; 370/352–354; 709/230, 231
See application file for complete search history.

(56) References Cited

U.S. PATENT DOCUMENTS

| | | | | |
|---|---|---|---|---|
| 6,134,530 | A * | 10/2000 | Bunting et al. | 705/7.25 |
| 6,636,598 | B1 * | 10/2003 | Thomson et al. | 379/265.05 |
| 6,704,303 | B1 | 3/2004 | Bowman-Amuah | |
| 6,842,752 | B2 * | 1/2005 | Itabashi et al. | 1/1 |
| 7,299,259 | B2 | 11/2007 | Petrovykh | |
| 7,428,531 | B2 | 9/2008 | Barron et al. | |
| 8,126,133 | B1 * | 2/2012 | Everingham et al. | 379/265.01 |
| 2001/0046209 | A1 * | 11/2001 | Glassman | 370/230 |
| 2004/0117383 | A1 * | 6/2004 | Lee et al. | 707/100 |
| 2005/0163302 | A1 | 7/2005 | Mock et al. | |
| 2006/0002540 | A1 * | 1/2006 | Kreiner et al. | 379/265.02 |
| 2007/0116185 | A1 | 5/2007 | Savoor et al. | |
| 2007/0154007 | A1 * | 7/2007 | Bernhard | 379/265.01 |
| 2010/0027778 | A1 * | 2/2010 | Kumar et al. | 379/265.09 |
| 2010/0142698 | A1 * | 6/2010 | Spottiswoode et al. | 379/265.11 |

* cited by examiner

*Primary Examiner* — Oleg Asanbayev
(74) *Attorney, Agent, or Firm* — Lowe Graham Jones PLLC

(57) ABSTRACT

Systems and methods of providing customer support are disclosed. An exemplary embodiment compares a plurality of customer attributes associated with corresponding ones of a plurality of service representative attributes to identify a "best match" service representative.

15 Claims, 3 Drawing Sheets

US 8,792,631 B2

SYSTEM AND METHOD FOR MATCHING SERVICE REPRESENTATIVES WITH CUSTOMERS

BACKGROUND

When a customer contacts an organization regarding a service need, a service representative typically interfaces with the customer to address the customer's service needs. During such person-to-person interfaces between the customer and the service representative, various difficulties may arise.

For example, the native languages of the customer and the service representative may be different. Even if the service representative is familiar with the customer's native language on a conversational basis, language barriers may still prohibit effective and efficient exchanges between the customer and the service representative.

As another example, the service representative may not relate to the particular concern of the customer. In a situation where the customer is an enthusiastic fan of a certain sports team, the customer's need may involve a service relating to the sports team. If the service representative is unfamiliar with the sports team or with the needs related to that sport, the service representative's unfamiliarity may impair effective and efficient exchanges between the customer and the service representative.

Accordingly, it is desirable to facilitate effective and efficient person-to-person exchanges between the customer and the service representative. Such person-to-person exchanges between the customer and the service representative can be facilitated when attributes of the service representative correspond to attributes of the customer. For example, it may be desirable to have a service representative fluent in the customer's native language interface with the customer. As another example, it may be desirable to have a service representative who is a fan of the same sports team as the customer interface with the customer.

However, matching service representative attributes with customer attributes is not easily accomplished. Further, in many situations, matching the service representative attributes with customer attributes must be done in a very short period of time. For example, if the customer calls into the organization's call center with a question, then there will be relatively little time to locate a service representative with attributes that match the customer's attributes if the customer is to be serviced in a timely manner.

SUMMARY

Systems and methods of providing customer support are disclosed. An exemplary embodiment compares a plurality of customer attributes associated with corresponding ones of a plurality of service representative attributes to identify a "best match" service representative.

BRIEF DESCRIPTION OF THE DRAWINGS

Preferred and alternative embodiments are described in detail below with reference to the following drawings.

DETAILED DESCRIPTION

Figure 1:
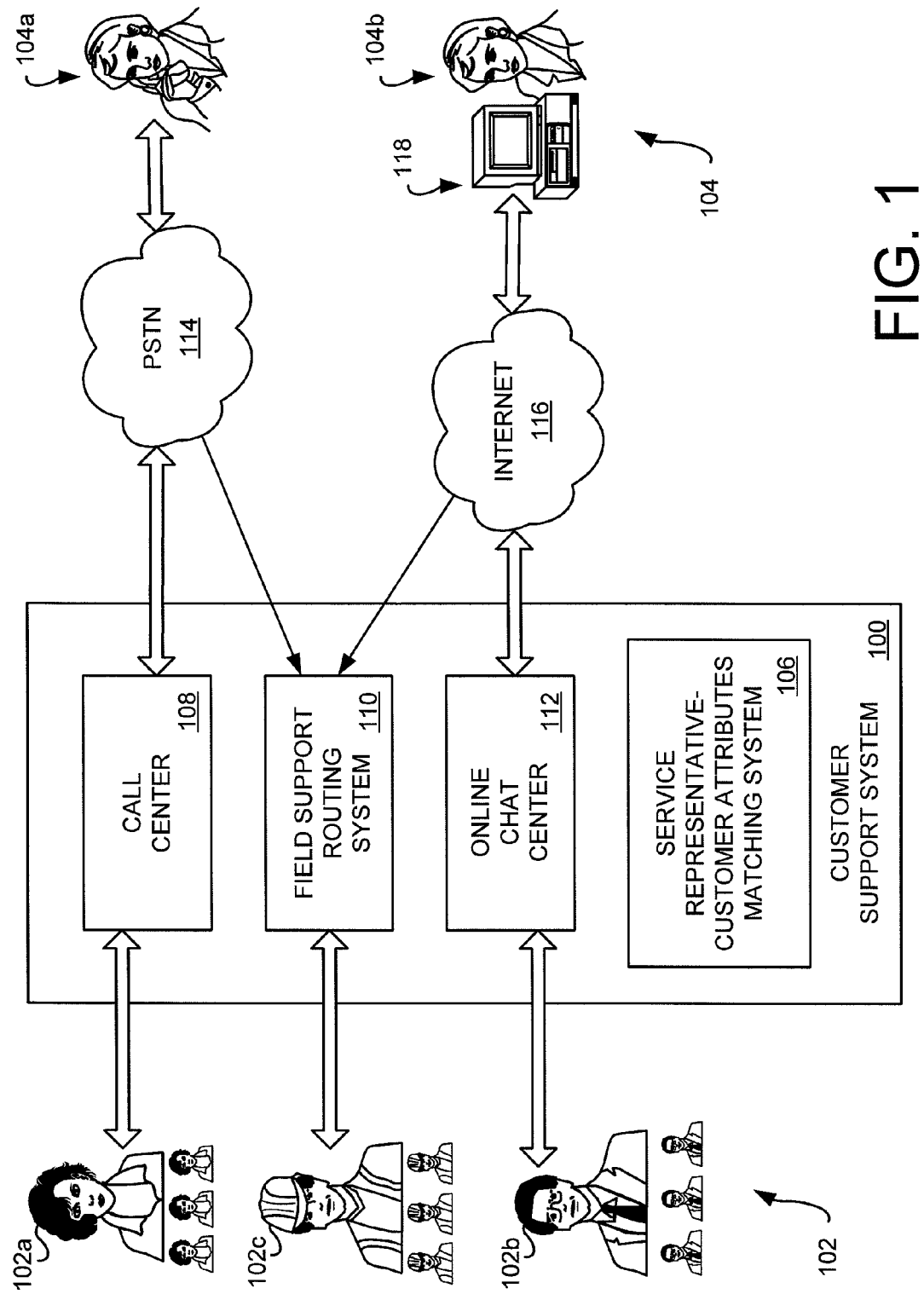
FIG. 1 is a block diagram of an embodiment of a customer support system.

Embodiments of the customer support system 100 provide a system and method for matching a service representative 102 with a current customer 104 based upon attributes of the service representative 102 and attributes of the current customer 104 to facilitate person-to-person interactions. The exemplary embodiment of the customer support system 100 includes a service representative-customer profile matching system 106, and at least one of a call center 108, a field support routing system 110, and an online chat center 112.

When a customer 104 contacts an organization regarding a service need (thus becoming a current customer 104), a service representative 102, at some point, interfaces with the customer 104 in a person-to-person exchange to address the customer's service needs. Embodiments of the customer support system 100 select a "best match" service representative 102 from a plurality of available service representatives 102 by comparing attributes of each of the plurality of available service representatives 102 with attributes of the current customer 104. Then, based upon the attribute comparison, a "best match" service representative 102 is selected.

There are many different types of call centers 108 with varying degrees of automation. Upon receipt of the customer's phone call, some call centers 108 will use an intermediary service representative who queries the customer 104a to initially determine the purpose of the current customer's telephone call (request). Other call centers 108 may be automated, wholly or partially, wherein a voice recognition system or the like queries the customer 104a to initially determine the purpose of the customer's telephone call. Once the purpose of the current customer's telephone call is determined, the call center 108 begins the process to identify an available "best match" service representative 102.

Based upon a comparison of the current customer's attributes with attributes of a plurality of available service representatives 102, a "best match" service representative 102a is identified. The "best match" service representative 102a has attributes that correspond to (match with) the attributes of the customer 104a. Then, a phone call connection is automatically established between the identified "best match" service representative 102a and the customer 104. That is, the "best match" service representative 102a is connected to the current customer 104a by the call center 108, and the service representative 102a receives the customer's telephone call. Since the service representative 102a has one or more attributes which correspond to attributes of the customer 104a, the ensuing person-to-person exchange between the service representative 102a and the customer 104a is enhanced.

In some instances, a customer 104b may access the organization's online chat center 112, via the Internet 116. Here, the online chat center 112 receives an electronic inquiry regarding a service question or need. The customer 104b accesses the online chat center 112 using their computer 118 or another suitable network connectable device. Some sort of log-in procedure or the like, provides identification of the customer 104b. For example, a log-in process may receive entry of the customer's name, address, account identifier, and/or password. The received information may then be used to identify the customer 104b.

Upon receipt of the current customer's online log in, some online chat centers 112 will use one or more interactive menus to determine the nature of the customer's service question or need. Other online chat centers 112 may present a selection of web pages, pull down boxes, or the like, to the customer 104b. Once the purpose of the current customer's online log in has been determined, the online chat center 112 identifies a "best match" service representative 102*b* from a plurality of available service representatives 102. The "best match" service representative 102*b* has attributes that correspond to (match with) the attributes of the current customer 104*b*.

Based upon a comparison of the current customer's attributes with attributes of the available service representatives 102, a "best match" service representative 102*b* is identified. Then, an interactive on-line chat session is established between the identified "best match" service representative 102*b* and the customer 104*b*. Various types of on-line or web-based "live chat" systems and processes may be used by the various embodiments. Since the service representative 102*b* has one or more attributes which correspond to attributes of the current customer 104*b*, the ensuing person-to-person exchange between the service representative 102*b* and the current customer 104*b* is enhanced.

In yet other instances, a customer 104 may make a telephone call to the organization to request a service visit which requires an on-site visit by one or more service representatives 102. Alternatively, or additionally, the customer 104 may access an on-line help request system via the Internet 116. For example, the customer 104 may need assistance in replacing a defective purchased unit or in obtaining repair of an inoperable unit.

Upon receipt of the customer's service request, a service ticket or the like is generated at the field support routing system 110. The service ticket identifies the nature of the service request, identifies the location of the service call, identifies the current customer 104, and/or identifies a schedule for the service call. A non-limiting example of a field support routing system 110 is a service center or service dispatch center.

The embodiment identifies a plurality of local service representatives 102 from its pool of service representatives 102. Here, the organization is expected to have two or more geographically based service territories with particular service representatives 102 assigned to a local location, such as a service center. Accordingly, a plurality of local service representatives 102 are identified who are assigned to the geographic region of the location of the current customer 104.

Based upon a comparison of other ones of the current customer's attributes with attributes of the available local service representatives 102, a "best match" service representative 102*c* is identified from the available local service representatives 102. Accordingly, embodiments automatically generate an assignment of the identified "best match" service representative to the service call at the customer's location. Then, the "best match" service representative 102*c* can be dispatched to the location of the service call. In many instances, the "best match" service representative 102*c* interacts with the current customer 104 during the service call. Since the "best match" service representative 102*c* has one or more attributes which correspond to attributes of the current customer 104, the ensuing person-to-person exchange between the "best match" service representative 102*c* and the customer 104 is enhanced.

Figure 2:
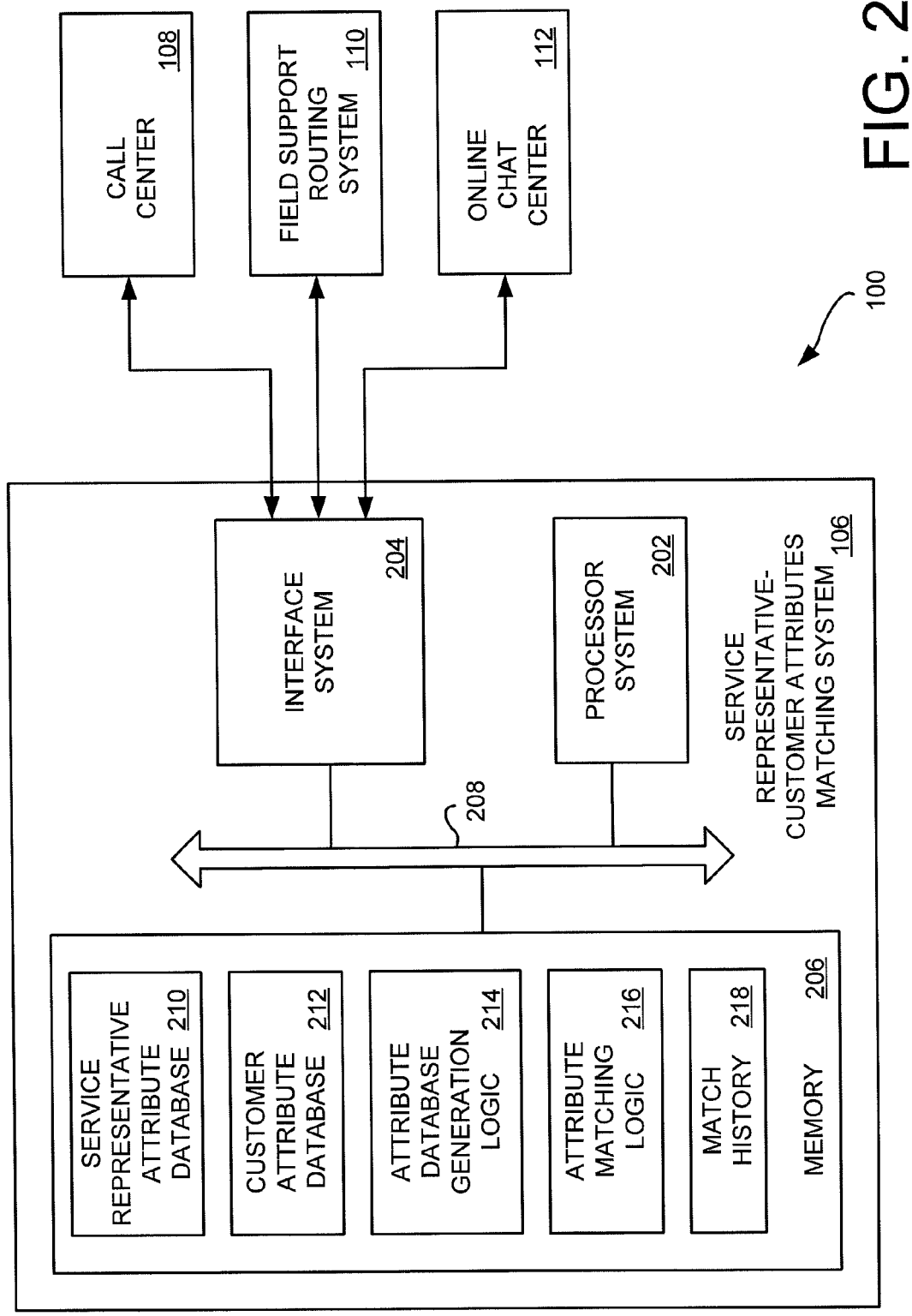
FIG. 2 is a block diagram of an embodiment of a service representative-customer attributes matching system.

FIG. 2 is a block diagram of an embodiment of a service representative-customer attributes matching system 106. The service representative-customer attributes matching system 106 comprises a processor system 202, an interface system 204, and a memory 206. The processor system 202, the interface system 204, and the memory 206 are communicatively coupled to a communication bus 208, thereby providing connectivity between the above-described components. In alternative embodiments of the service representative-customer attributes matching system 106, the above-described components may be communicatively coupled to each other in a different manner. For example, one or more of the above-described components may be directly coupled to the processor system 202, or may be coupled to the processor system 202 via intermediary components (not shown). Further, additional components (not shown) may be included in alternative embodiments of the service representative-customer attributes matching system 106.

Attributes pertaining to the service representatives 102 reside in the service representative attribute database 210 stored in memory 206. Attributes pertaining to the customers 104 reside in the customer attribute database 212 stored in memory 206. Attributes for a particular service representative 102 and a particular customer 104 are identified and associated with a unique identifier. Non-limiting examples of an identifier may be an individual's name, an account number, an employee number, a social security number, a driver license number, or any other predefined identifier. The identifier identifies the particular service representative 102 and the particular customer 104 in the databases 210, 212. Any suitable database format may be used by various embodiments.

An attribute identifies a characteristic of interest that is associated with a particular service representative 102 and particular customer 104. Attributes are used to identify a "best match" service representative 102 for a particular person-to-person interface with a customer 104. Non-limiting examples of attributes of interest include the individual's native language, other languages which the individual may be fluent or conversant in, the individual's current residence, places where the individual has previously lived, the individual's education background and/or schools attended, the individual's personal characteristics (age, sex, and/or ethnicity), the individual's hobbies and/or interests, the individual's work background and/or experience, etc. Other non-limiting examples of attributes of interest include an individual's likes, dislikes, and/or preferences (favorite sport teams, favorite types of food, favorite types of pet, preference for vacation locations, etc.). Any suitable attribute may be used when the attribute is used to identify a "best match" service representative 102.

The attributes for the service representative 102 and/or the customer 104 are entered into the service representative attribute database 210 and the customer attribute database 212, respectively, by the attribute database generation logic 214. The attribute database generation logic 214 receives input from the service representative 102 and/or the customer 104 identifying a particular attribute. The specified attribute is associated with the identifier of the service representative 102 and/or the customer 104, and then the information is used to populate (store) the appropriate attribute database 210, 212 with the specified attribute information.

Any suitable database format may be used by various embodiments for storing attribute information and the identifiers for particular service representatives 102 and particular customers 104 in the attribute databases 210, 212. In some embodiments, the attribute databases 210, 212 may be combined. In some embodiments, the attribute databases 210, 212 reside in an a different memory, and/or may reside in a distributed memory system with memory units at various locations.

Embodiments may use one or more information gathering means to populate the attribute databases 210, 212 with attribute information. For example, an embodiment may use a survey sheet or the like, either hand written or in electronic format, that may be filled out by the service representative 102 and/or the customer 104. The survey would identify a plurality of attributes of interest. The survey would also request information pertaining to the identified attributes of interest. Based on the information provided in the completed survey, the attribute information is determined and saved into the appropriate one of the attribute databases 210, 212.

Another embodiment may use an interactive questionnaire that is presented to the service representative 102 and/or the customer 104. For example, during a log in process to the online chat center 112, the questionnaire may be presented to the customer 104. As another example, an invitation e-mail may be sent to a particular service representative 102 or a particular customer 104 which invites them to fill out the questionnaire. The questionnaire responses are automatically communicated to the attribute database generation logic 214 to populate the attribute databases 210, 212 with attribute information.

In another embodiment, notes taken by a person having a discussion with the service representative 102 and/or the customer 104 may be used to populate the attribute databases 210, 212 with attribute information. For example, a customer 104 may sign up for service with the organization. As part of the process of signing up the customer 104, a service agent or the like may gather information which pertains to various attributes of interest. The gathered information is then provided to the attribute database generation logic 214 to populate the attribute databases 210, 212 with attribute information.

In some embodiments, a customer 104 may be provided an opportunity to participate in a program that matches a service representative 102 with that particular customer 104. The customer 104, if they elect to "opt in" and participate, would then be asked a series of questions pertaining to various attributes of interest. The attribute information may be obtained manually, electronically, or a combination thereof. For customers 104 who have elected to "opt in" and participate, embodiments would then identify a "best match" service representative 102 having similar attributes of interest as the customer 104.

When an "opt in" feature is used, the customer's attribute information may be permanently stored, or temporarily stored, into the customer attribute database 212 for that particular customer 104. Thus, the customer 104 may only need to "opt in" a first time. Accordingly, when the customer 104 later requests service, a "best match" service representative 102 is automatically selected. Alternatively, some embodiments may provide an opportunity for the customer to "opt in" each time the customer 104 requests service, and/or may provide an opportunity for the customer 104 to "opt out" of the process of selecting a "best match" service representative 102. For example, if the customer 104 only needs specific billing information, the customer may choose to "opt out" and take the next available service representative 102.

The interface system 204 provides an interface with the organization's call center 108, the field support routing system 110, and/or the online chat center 112. The call center 108, the field support routing system 110, and/or the online chat center 112 may be communicatively coupled to the interface system 204 using any suitable communication system and may use any suitable communication medium. Information may be communicated between the interface system 204 and the call center 108, the field support routing system 110, and/or the online chat center 112 manually, electronically, or a combination thereof. For example, the online chat center 112 may be communicatively coupled to the interface system 204 via the Internet so that the process of identifying a "best match" service representative 102 is automatic. As another example, a person working in the field support routing system 110 may make a telephone call to another person working at the installation site of the service representative-customer profile matching system 106 to identify the "best match" service representative 102, who is then assigned to the work order ticket.

Some embodiments of the interface system 204 receive attribute information pertaining to a current customer 104 when the customer 104 contacts the organization regarding their service need. For example, when a current customer 104 logs into the online chat center 112, the current customer 104 may provide attribute information pertaining to their particular need, location or the like. The received attribute information may be immediately used to identify the "best match" service representative 102 for the current customer. Additionally, or alternatively, the received attribute information may be saved into the customer attribute database 212.

In some applications, the various systems and components of the customer support system 100 are centrally located together at one site. In other applications, the various systems and components of the customer support system 100 are distributed at different sites. For example, a plurality of field support routing systems 110 may be located in different service territories. When a "best match" service representative 102 needs to be identified for a work order ticket, the local field support routing system 110 can contact the service representative-customer profile matching system 106 to identify the "best match" service representative 102.

Further, individual components of the service representative-customer profile matching system 106 may be located at different sites. For example, the memory 206 may be located at a remote site which is accessed by the processor system 202 when a "best match" service representative 102 is being identified.

As noted herein, when a customer 104 contacts the organization, at some point, a service representative 102 will be having a person-to-person exchange with the customer 104. The process of identifying a "best match" service representative 102 is performed by the processor system 202 using the attribute information stored in the attribute databases 210, 212. Based upon an identification of a current customer 104 requesting a service, selected ones of the attributes, or all of the attributes, pertaining to the current customer 104 are retrieved from the customer attribute database 212 and/or received from the interface system 204.

The attribute matching logic 216 compares selected ones of, or all of, the attributes of a plurality of available service representatives 102 with the attributes of the customer 104. Based upon a correlation between the attributes of each of the plurality of available service representatives 102 and the customer 104, a "best match" service representative 102 is identified.

In an exemplary embodiment, the "best match" service representative 102 is identified based upon the greatest number of attribute matches with the current customer 104. Alternatively, or additionally, the "best match" service representative 102 is identified based upon a number of attribute matches with the current customer 104 that is greater than a predefined threshold. Any suitable number of attributes may be considered during the process of selecting a "best match" service representative 102 by the various embodiments.

For example, the total number of the attributes of interest that are considered (and thus stored in the attribute databases 210, 212) may be twenty. The service representative 102 who has sixteen attribute matches with the current customer 104 would be selected as a "best match" service representative 102 over a service representative 102 who only has two attribute matches. However, in embodiments that employ an attribute matching threshold of eighteen attributes, neither of the service representatives 102 would qualify as a "best match" service representative 102 since neither of the service representatives 102 had at least eighteen attribute matches. Accordingly, a default selection process would identify a service representative 102 from the plurality of available service representatives 102.

In one embodiment, if none of the available service representatives 102 have a threshold number of attributes that match the attributes of the current customer 104, then a "best match" service representative 102 is selected based upon the particular service representative 102 that has the most attribute matches. That is, the "best match" service representative 102 is based upon a default closest fit to the attributes of the current customer 104. In some embodiments, a second threshold of attribute matches (that is less than the first threshold) may be used to identify the "best match" service representative 102 for the current customer 104.

Further, availability of the service representatives 102 may be considered. That is, the "next available" service representative 102 with the closest number of attribute matches, or a number of attribute matches at least equal to a second threshold (that is less than the first threshold), is identified as the "best match" service representative 102 for the current customer 104.

In some embodiments, the number of attributes considered may vary depending upon the nature of the service need of the current customer 104. For example, if the service need of the current customer 104 pertains to paying a bill or changing a service address, the number of considered attributes may be relatively low since the customer's service need is relatively simple. If the same customer 104 has a service need that is very complex, then the number of considered attributes may be relatively high. In such embodiments, a data table or the like identifying the nature of the current customer's service need and the number of attributes for corresponding attribute matching thresholds might be included as part of, or may be accessed by, the attribute matching logic 216.

In some embodiments, the attributes of interest may be weighted. That is, some attributes may be more important than other attributes. Further, some attributes may be used to disqualify a service representative 102 as a "best match" service representative 102. For example, an attribute pertaining to the current customer's native language may be given more weight than a favorite type of pet. Thus, even if one of the plurality of available service representatives 102 likes the same type of pet as the current customer 104, that particular service representative 102 would not be selected as a "best match" service representative 102 if they did not speak the same language.

In some embodiments, a plurality of "best match" service representatives 102 are identified from the plurality of available service representatives 102. For example, an identified "best match" service representative 102 may be busy with another customer 104, or on break, or not immediately available for another reason. Accordingly, there may be a delay in placing the identified "best match" service representative 102 with the customer 104. However, if a plurality of "best match" service representatives 102 are identified, then one of the currently available "best match" service representatives 102, or the next available "best match" service representative 102, may be more quickly placed in contact with the current customer 104.

Some embodiments track the history of person-to-person exchanges between a particular customer 104 and previously selected "best match" service representatives 102. In the event that the customer 104 has a gratifying experience in working with a particular "best match" service representative 102, then upon subsequent requests for service, that customer 104 would be placed in contact with that same "best match" service representative 102 (if available). Thus, a long term working relationship between a particular customer 104 and a preferred "best match" service representatives 102 can be established. Historical information pertaining to a customer's preference for a particular "best match" service representative 102 is stored in the match history 218 of the memory 206.

It is appreciated that in some situations a "best match" service representative 102 will not be identified by embodiments of the customer support system 100. In such situations, another one of the plurality of available service representatives 102 will be selected to contact the customer 104 so that the person-to-person exchange between the selected service representative 102 and the customer 104 may proceed on a more timely basis. Any suitable default service representative 102 selection process may be used.

Figure 3:
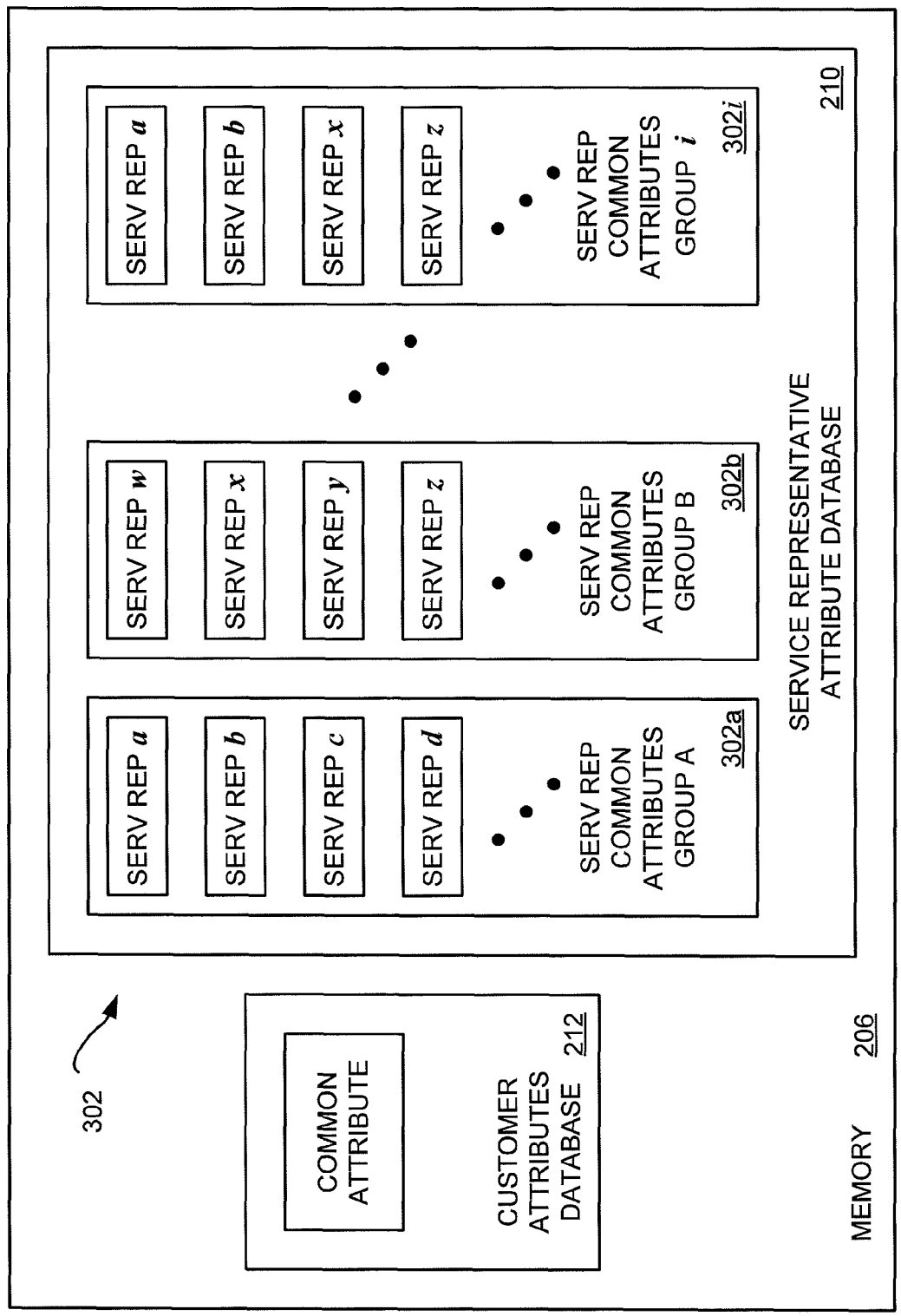
FIG. 3 illustrates a plurality of predefined service representative common attribute groups.

FIG. 3 illustrates a plurality of predefined service representative common attribute groups 302. As noted herein, some embodiments of the customer support system 100 identify a plurality of "best match" service representatives 102. Some organizations are very large and provide many different types of services and/or products. Such large organizations may have a large number of service representatives 102. Further, for any particular type of service and/or product, the organization may have a relatively large number of specialized service representatives 102 who are experts in particular services and/or products. Accordingly, it may take a considerable amount of time if the attributes for all of the plurality of available service representatives 102 are evaluated with the attributes of a single current customer 104 to identify a single "best match" service representative 102. To save time, some embodiments of the customer support system 100 employ a plurality of predefined service representative common attribute groups 302.

A service representative common attribute group 302 is a collection or grouping of a plurality of identified service representatives 102 that share a common attribute. Non-limiting examples of a common attribute include the expertise of the service representative 102, the geographic location of the service representative 102, and the native language of the service representative 102. Any suitable common attribute may be used to define a service representative common attribute group 302. The service representatives 102 who have the common attribute are grouped into a pool of available service representatives 102 for that particular common attribute group 302. Further, a particular service representative 102 may be included in multiple service representative common attribute groups 302 if the attributes of that particular service representative 102 qualify them for inclusion in multiple service representative common attribute groups 302.

Accordingly, when a customer 104 contacts the organization for a service need, the process of identifying a "best match" service representative 102 begins by matching the common attribute of the customer with the common attribute of one of the predefined service representative common attribute groups 302. Therefore, the attributes of only those available service representatives 102 included in the qualifying service representative common attribute group 302 are further evaluated. Service representatives 102 not included in the qualifying service representative common attribute group 302 are not considered.

For example, the organization may provide a service and/or a product in Atlanta, Ga., and in Denver, Colo. If a current customer 104 in Denver is requesting a service call, then it would not be practical to consider available service representatives 102 in Atlanta for the Denver service call. Accordingly, the common attribute is location of the available service representatives 102 and there would be two service representative common attribute groups 302. One service representative common attribute group 302 would identify a plurality of available service representatives 102 in Denver to select from. The other service representative common attribute group 302 would identify a plurality of available service representatives 102 in Atlanta to select from. Thus, by only considering the available service representatives 102 in Denver for a service call located in Denver, embodiments of the customer support system 100 may more efficiently and quickly identify the "best match" service representative 102 for the current customer 104 who is located in Denver.

As another example, the organization may provide service in a variety of different countries with different native languages. If the customer 104 in Denver (speaking English as their native language, as identified in their attributes information) has called into the call center 108, then embodiments of the customer support system 100 consider available service representatives 102 who speak English. On the other hand, if a customer 104 in Paris (speaking French as their native language, as identified in their attributes information) has called into the call center 108, then embodiments of the customer support system 100 consider available service representatives 102 who speak French. Accordingly, the common attribute is native language of the available service representatives 102 and there would be two service representative common attribute groups 302. One service representative common attribute group 302 would include a plurality of available English speaking service representatives 102. The other service representative common attribute group 302 would include a plurality of available French speaking service representatives 102. Thus, embodiments of the customer support system 100 may more efficiently and quickly identify a "best match" service representative 102.

Some embodiments may define common attribute subgroups for available service representatives 102. That is, some embodiments may nest one or more service representative common attribute groups 302 within a particular predefined service representative common attribute group 302. For example, a service representative common attribute group 302 may be initially based upon geographic location. Then, service representative common attribute sub-groups 302 may be based on native language. For example, Denver may be used to define a pool of available service representatives 102 located in Denver. Then, a plurality of service representative common attribute sub-groups 302 may be based on native language, such as English and Spanish. Thus, if a Spanish speaking customer 104 living in Denver requests a service call to their home, then the nested pool of qualified service representatives 102 in Denver who speak Spanish can be evaluated to identify a "best match" service representative 102 (since they are members of the nested service representative common attribute group 302 defined by the location Denver, and further defined by their native language, Spanish).

It is appreciated that some embodiments may dynamically identify a plurality of available service representatives 102 based upon one or more common attributes. That is, attributes are considered in a predefined order. For example, attributes may be first considered by location to identify a plurality of available service representatives 102 in a location common with a particular customer 104. Then, attributes may be further considered based on a subsequent common attribute, such as native language. Accordingly, a plurality of available service representatives 102 located in the common location and speaking the same native language as the customer 104 are identified. Then, further consideration of other attributes may be used to identify the "best match" service representative 102 for that particular customer 104.

In some embodiments, there may not be a "best match" service representative 112 based upon a customer attribute of interest. Some embodiments may be configured to provide a selected service representative information regarding the attribute of interest such that the interaction between the service representative 102 and the customer 104 is enhanced. For example, if there are no service representatives 102 that like football currently available, but the customer 104 is a known football fan, the selected service representative 102 could receive a small popup window with an introduction to football, the home team for the customer's service address, and even performance statistics on the home team's season. Accordingly, the selected service representative 102 has some insight about the customer 104.

It should be emphasized that the above-described embodiments of the customer support system 100 are merely possible examples of implementations of the invention. Many variations and modifications may be made to the above-described embodiments. All such modifications and variations are intended to be included herein within the scope of this disclosure and protected by the following claims.

What is claimed is:

1. A method, comprising:
receiving, at a customer support system, a customer request that is received from a customer;
requesting, by the customer support system, information pertaining to at least one of a plurality of customer attributes about the customer in response to receiving the customer request;
receiving, at the customer support system, the plurality of customer attributes associated with the customer, wherein the plurality of customer attributes includes a location associated with the customer, a native language of the customer, and a preference of the customer, and wherein the preference of the customer comprises at least two of a favorite sports team, a favorite type of food, a favorite type of pet, and a favorite vacation location;
retrieving, by the customer support system from a service representative attribute database, a plurality of service representative attributes associated with a plurality of available service representatives, wherein the plurality of service representative attributes of the service representative attribute database are stored in a memory, and wherein the retrieved plurality of service representative attributes uniquely correspond to the plurality of customer attributes;
comparing, by the customer support system, the plurality of customer attributes with corresponding ones of the plurality of service representative attributes;
identifying, by the customer support system, a "best match" service representative from the plurality of available service representatives based upon the comparison of the plurality of customer attributes with the corresponding ones of the plurality of the service representative attributes;
presenting information provided by the customer support system to the identified "best match" service representative pertaining to the preference of the customer; and
automatically establishing a phone call connection, by the customer support system, between the identified "best match" service representative and the customers;
wherein the method further comprises:

predefining a first group of available service representatives from the plurality of available service representatives based upon a shared first common attribute; and predefining a second group of available service representatives from the plurality of available service representatives based upon a shared second common attribute, wherein the shared second common attribute is different from the shared first common attribute; and initially comparing, by the customer support system, the plurality of customer attributes with the shared first common attribute and the shared second common attribute, wherein the service representative attributes of the first group of available service representatives are compared by the customer support system with the customer attributes in response to at least one of the customer attributes matching the shared first common attribute, wherein the "best match" service representative is identified by the customer support system from the first group of available service representatives, wherein the service representative attributes of the second group of available service representatives are compared by the customer support system with the customer attributes in response to at least one of the customer attributes matching the shared second common attribute, and wherein the "best match" service representative is further identified by the customer support system from the second group of available service representatives.

2. The method of claim 1, wherein the comparing further comprises:

determining a number of service representative attributes that correspond to the customer attributes for each of the plurality of available service representatives;

identifying a plurality of preferred service representatives from the plurality of available service representatives, wherein each of the identified preferred service representatives has their number of service representative attributes at least equal to a threshold; and identifying from the plurality of preferred service representatives a next available service representative as the "best match" service representative.

3. The method of claim 1, wherein identifying the "best match" service representative from the plurality of available service representatives comprises:

determining a number of service representative attributes that correspond to the customer attributes for each of the plurality of available service representatives, wherein the "best match" service representative has a greatest number of service representative attributes.

4. The method of claim 1, further comprising:

retrieving remaining ones of the customer attributes from the memory.

5. The method of claim 1, further comprising:

receiving the plurality of customer attributes prior to receiving the customer's request; and storing the plurality of customer attributes in the memory.

6. A method, comprising:

predefining a first group of available service representatives from a plurality of available service representatives based upon a shared first common attribute;

predefining a second group of available service representatives from the plurality of available service representatives based upon a shared second common attribute, wherein the shared second common attribute is different from the shared first common attribute;

receiving a first electronic customer inquiry from a customer at an online chat center;

requesting, by the online chat center, information pertaining to at least one of a plurality of customer attributes about the customer in response to receiving the first electronic customer inquiry;

receiving, at the online chat center, the plurality of customer attributes associated with the customer that initiated the first electronic customer inquiry, wherein the plurality of customer attributes includes a location associated with the customer, a native language of the customer, and a preference of the customer, and wherein the preference of the customer comprises at least two of a favorite sports team, a favorite type of food, a favorite type of pet, and a favorite vacation location;

retrieving, by the online chat center, a plurality of service representative attributes for the plurality of available service representatives, wherein the plurality of service representative attributes retrieved from a service representative attribute database are stored in a memory, and wherein the retrieved plurality of service representative attributes uniquely correspond to the plurality of customer attributes;

comparing, by the online chat center, the plurality of customer attributes with respective ones of the plurality of service representative attributes, wherein the comparing comprises:

initially comparing, by the online chat center, the plurality of customer attributes with the shared first common attribute and the shared second common attribute, wherein the service representative attributes of the first group of available service representatives are compared by the online chat center with the customer attributes in response to at least one of the customer attributes matching the shared first common attribute, wherein the service representative attributes of the second group of available service representatives are compared by the online chat center with the customer attributes in response to at least one of the customer attributes matching the shared second common attribute;

identifying, by the online chat center, a "best match" service representative from the plurality of available service representatives based upon the comparison of the plurality of customer attributes with respective ones of the plurality of service representative attributes, wherein the "best match" service representative is identified by the online chat center from the first group of available service representatives, and wherein the "best match" service representative is identified by the online chat center from the second group of available service representatives;

establishing, by the online chat center, a first interactive on-line chat session between the identified "best match" service representative and the customer;

receiving a second electronic customer inquiry from the customer after a conclusion of the first electronic customer inquiry from the customer;

identifying the "best match" service representative who assisted the customer during the first electronic customer inquiry; and automatically establishing a second interactive on-line chat session between the identified "best match" service representative and the customer.

7. The method of claim 6, further comprising:
receiving a password of the customer; and
identifying the customer based upon the password.

8. The method of claim 6, further comprising:
receiving an identifier during a log-in process with the customer; and
identifying the customer based upon the received identifier.

9. The method of claim 6, further comprising:
receiving the plurality of customer attributes prior to receiving the electronic customer inquiry; and
storing the plurality of customer attributes in the memory.

10. The method of claim 1, wherein the request from the customer is a first request, wherein the phone call connection is a first phone call connection, wherein the identified "best match" service representative is an identified first "best match" service representative identified from the plurality of available service representatives, and further comprising:
receiving a second request from the customer after a conclusion of the first phone call connection associated with the first request from the customer;
determining that the first identified "best match" service representative assisted the customer during the first request; and
automatically establishing a second phone call connection between the identified first "best match" service representative and the customer.

11. The method of claim 1, wherein the request from the customer is a first request, wherein the phone call connection is a first phone call connection, and further comprising:
saving historical information pertaining to a person-to-person exchange between the customer and the identified "best match" service representative, wherein the historical information indicates whether the customer has a preference for the identified "best match" service representative;
receiving a second request from the customer after a conclusion of the first phone call connection associated with the first request from the customer;
determining that the customer has a preference for the previously identified "best match" service representative based on the saved historical information; and
automatically establishing a second phone call connection between the identified "best match" service representative and the customer.

12. A customer support system that identifies a "best match" service representative from a plurality of available service representatives, wherein a first group of available service representatives is predefined from the plurality of available service representatives based upon a shared first common attribute, and wherein a second group of available service representatives is predefined from the plurality of available service representatives based upon a shared second common attribute, and wherein the shared second common attribute is different from the shared first common attribute, comprising:
a system interface that receives a customer request from a customer;
a memory that stores a service representative attribute database with a plurality of service representative attributes; and a processor system communicatively coupled to the system interface and the memory, and operable to:
request information pertaining to at least one of the plurality of customer attributes about the customer in response to receiving the customer request;
receive a plurality of customer attributes associated with the customer,
wherein the plurality of customer attributes includes a location associated with the customer, a native language of the customer, and a preference of the customer, and
wherein the preference of the customer comprises at least two of a favorite sports team, a favorite type of food, a favorite type of pet, and a favorite vacation location;
retrieve, from the service representative attribute database, the plurality of service representative attributes associated with the plurality of available service representatives, wherein the retrieved plurality of service representative attributes uniquely correspond to the plurality of customer attributes;
compare the plurality of customer attributes with the shared first common attribute and the shared second common attribute;
identify the "best match" service representative from the plurality of available service representatives based upon the comparison of the plurality of customer attributes with the corresponding ones of the shared first common attribute and the shared second common attribute;
present information provided by the customer support system to the identified "best match" service representative pertaining to the preference of the customer; and
automatically establish a phone call connection between the identified "best match" service representative and the customer,
wherein the service representative attributes of the first group of available service representatives are compared by the customer support system with the customer attributes in response to at least one of the customer attributes matching the shared first common attribute, and
wherein the "best match" service representative is initially identified from the first group of available service representatives,
wherein the service representative attributes of the second group of available service representatives are compared with the customer attributes in response to at least one of the customer attributes matching the shared second common attribute, and
wherein the "best match" service representative is identified by the customer support system from the second group of available service representatives.

13. The system of claim 12, wherein the processor system is further operable to:
determine a number of service representative attributes that correspond to the customer attributes for each of the plurality of available service representatives;
identify a plurality of preferred service representatives from the plurality of available service representatives, wherein each of the identified preferred service representatives has their number of service representative attributes at least equal to a threshold; and
identify from the plurality of preferred service representatives a next available service representative as the "best match" service representative.

14. The system of claim 12, wherein the processor system is further operable to:
   determine a number of service representative attributes that correspond to the customer attributes for each of the plurality of available service representatives,
   wherein the "best match" service representative has a greatest number of service representative attributes.

15. The system of claim 12, wherein the processor system is further operable to:
   receive the plurality of customer attributes prior to receiving the customer's request; and
   store the plurality of customer attributes in the memory.

* * * * *